United States Patent [19]
Viets

[11] 3,941,335
[45] Mar. 2, 1976

[54] AUTOMATIC BOUNDARY LAYER CONTROL IN AN EJECTOR WING AIRCRAFT

[75] Inventor: Hermann Viets, Dayton, Ohio

[73] Assignee: The United States of America as represented by the Secretary of the Air Force, Washington, D.C.

[22] Filed: June 19, 1975

[21] Appl. No.: 588,552

[52] U.S. Cl............. 244/42 CC; 60/269; 137/15.2; 244/12 R; 417/189
[51] Int. Cl.² ........................................ B64C 21/08
[58] Field of Search........ 180/118, 120; 244/42 CC, 244/42 R, 12 R, 53 B; 417/189, 192, 198; 137/604, 15.2, 15.1; 60/269; 239/265.17

[56] References Cited
UNITED STATES PATENTS

| | | | |
|---|---|---|---|
| 3,402,726 | 9/1968 | Barry | 137/15.2 |
| 3,770,227 | 11/1973 | Von Ohain et al. | 244/42 CC |
| 3,819,134 | 6/1974 | Throndson | 244/42 CC |
| 3,834,834 | 9/1974 | Quinn | 417/198 X |

FOREIGN PATENTS OR APPLICATIONS

| | | | |
|---|---|---|---|
| 1,158,540 | 6/1958 | France | 244/42 CC |

Primary Examiner—Trygve M. Blix
Assistant Examiner—Paul E. Sauberer
Attorney, Agent, or Firm—Joseph E. Rusz; Richard J. Killoren

[57] ABSTRACT

An ejector wing, for an aircraft, having inlet and diffuser doors which move from an open take-off configuration to a closed forward flight configuration and having hypermixing nozzles and root nozzles for supplying primary air into a plurality of channels in the wing structure. Apparatus is provided for controlling the air flow from the root nozzles in the boundary layer in the channels. A plurality of sensing ports are provided in the channels upstream of the root nozzles. The differential pressures at the sensing ports are used to divide the flow to the root nozzles on opposite sides of the channels.

3 Claims, 5 Drawing Figures

U.S. Patent   March 2, 1976   Sheet 2 of 2   3,941,335
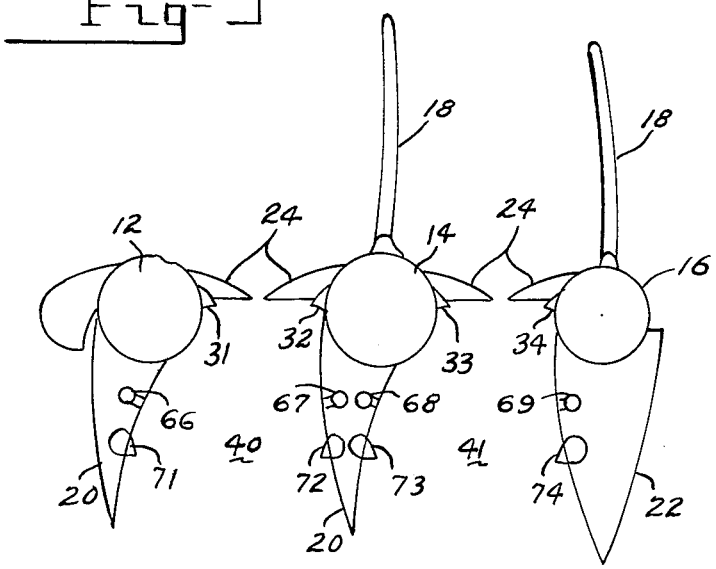
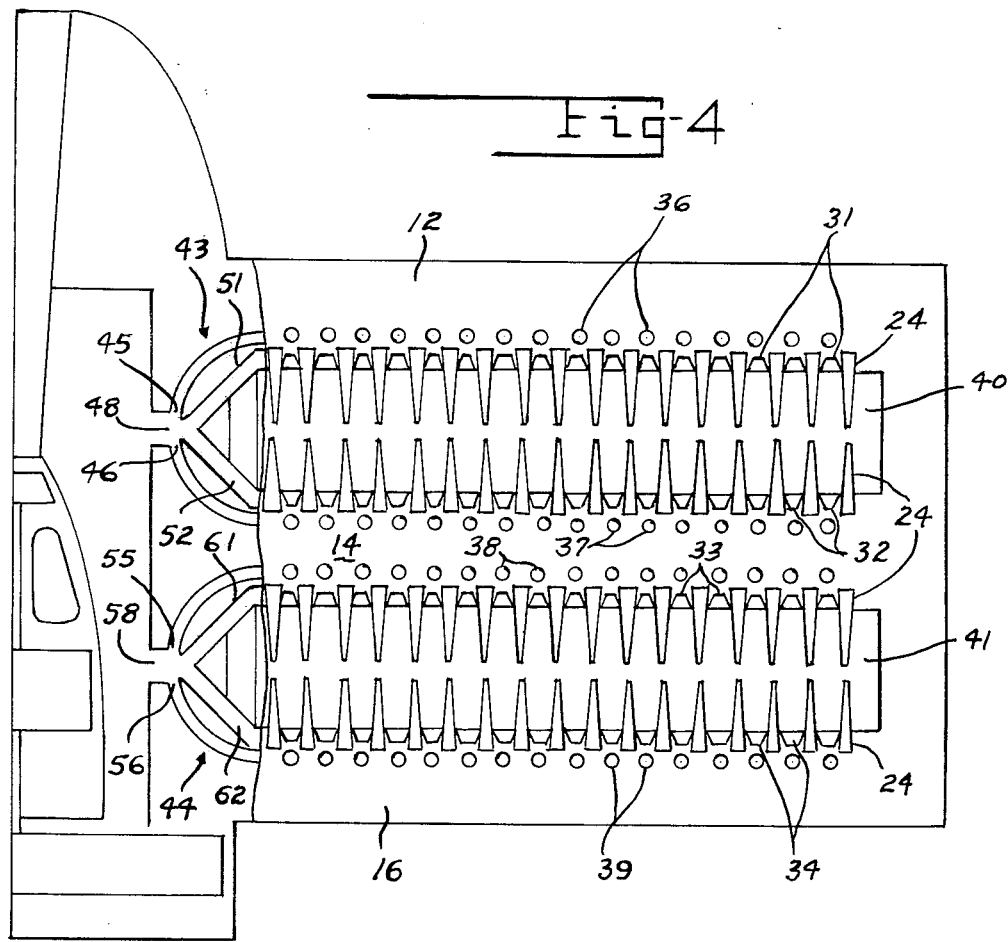

3,941,335

AUTOMATIC BOUNDARY LAYER CONTROL IN AN EJECTOR WING AIRCRAFT

RIGHTS OF THE GOVERNMENT

The invention described herein may be manufactured and used by or for the Government of the United States for all governmental purposes without the payment of any royalty.

BACKGROUND OF THE INVENTION

This invention relates to a thrust augmentation system for aircraft of the type capable of vertical, hovering, transitional and conventional flight operation. One such system is described in the patent to von Ohain et al, U.S. Pat. No. 3,770,227. The patent to Quinn, U.S. Pat No. 3,834,834, describes such a system which provides a plurality of hypermixing nozzles together with a plurality of root nozzles.

In these systems, the wing has a simple airfoil configuration when the inlet and diffuser doors are in the closed position. In the vertical take-off configuration, both the inlet and the diffuser doors are wide open. During the transition from vertical take-off to forward flight, the inlet doors are moved forward and the diffuser doors are tilted backward. More boundary layer control is then required near the forward portion of the channels than near the rearward portion.

BRIEF SUMMARY OF THE INVENTION

According to this invention, use is made of the fact that during transition the pressure near the forward portion of the channel is lower than near the rearward portion of the flow channel. Sensing ports are provided in the flow channels upstream of the root nozzles. The pressure differential in the ports, on opposite sides of the flow channels, are used to control the flow of air to the root nozzles to provide a greater flow through the forward nozzles, where a greater flow in the boundary layer is needed. An added benefit from this system is that both the ports on the forward and rearward portions of the flow channel suck air from the boundary layer which leads for further improvement of the boundary layer control characteristics.

IN THE DRAWINGS

FIG. 4 is a schematic diagram showing one system for supplying control flow to the boundary layer for the device of FIG. 1.

FIG. 5 is a schematic diagram of a modification of the device of FIG. 1.

DETAILED DESCRIPTION OF THE INVENTION

Figure 1:
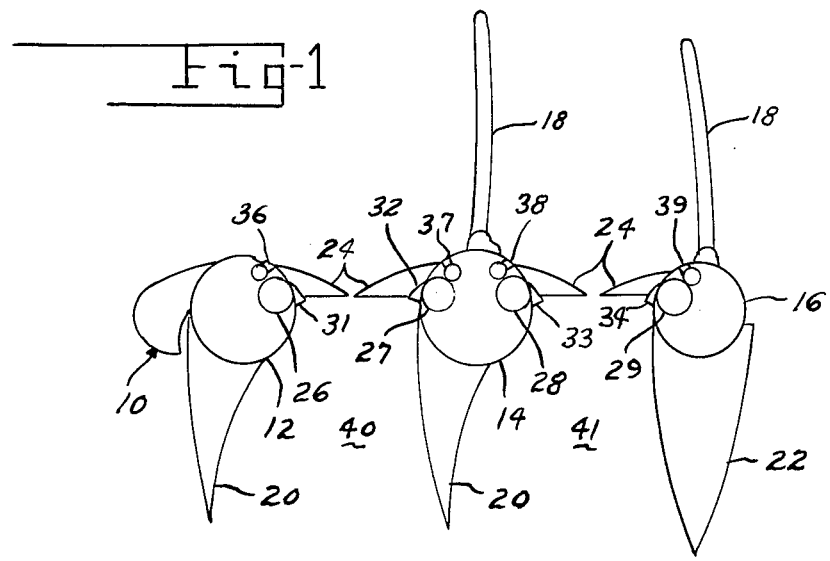
FIG. 1 is a schematic diagram showing a thrust augmentor wing system according to the invention.
Figure 2:
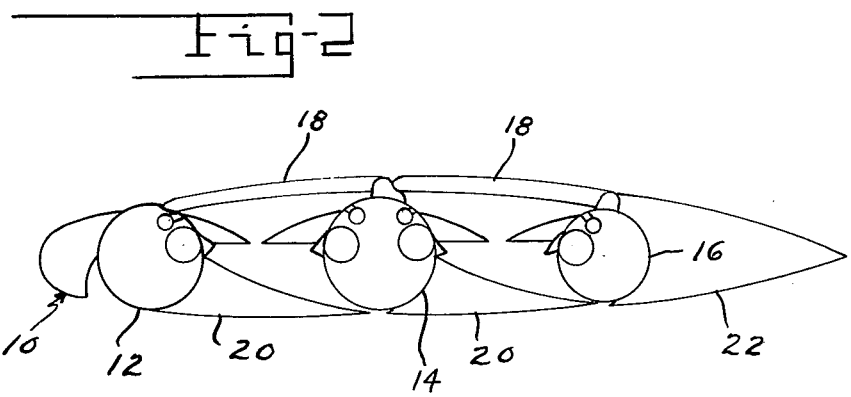
FIG. 2 shows the wing system of FIG. 1 in its closed configuration.

Reference is now made to FIG. 1 of the drawing which shows a wing structure 10 for an ejector wing aircraft. The wing structure has a plurality of hollow spar members 12, 14 and 16 similar to those shown in the von Ohain patent. Inlet doors 18 and outlet diffuser doors 20 and 22 may be positioned as shown in FIG. 2 to provide an airfoil structure for forward flight. Air is supplied to a plurality of hypermixing nozzles 24 through the spars 12, 14 and 16 in a conventional manner.

Figure 3:
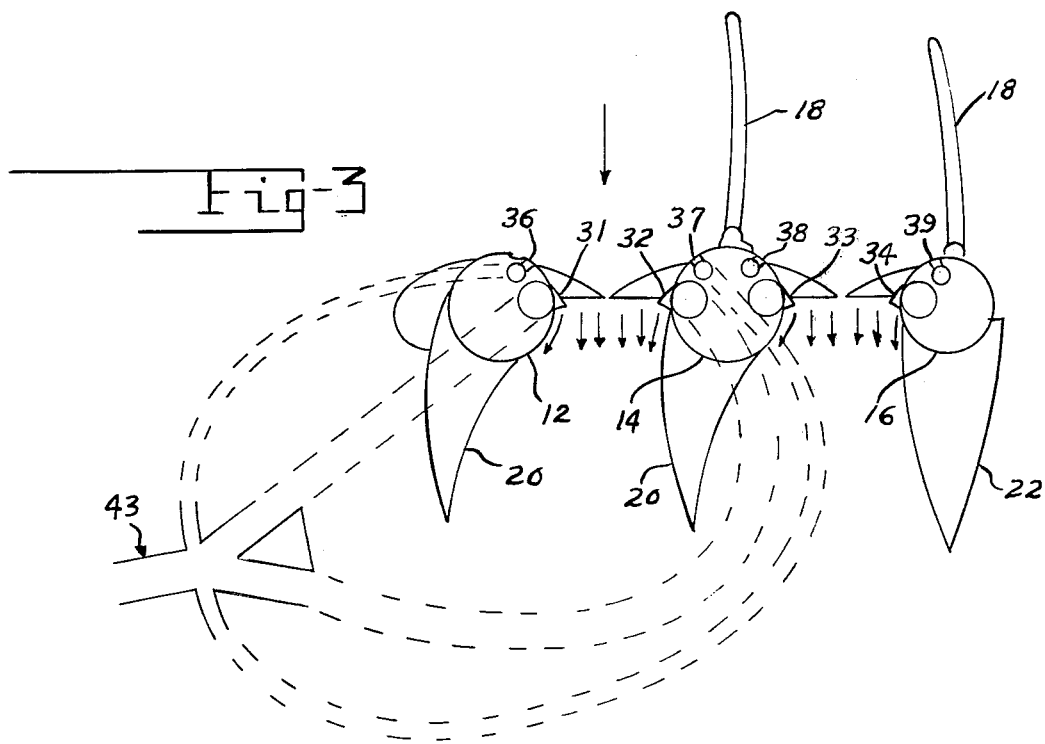
FIG. 3 is a schematic diagram showing the boundary layer control system of the invention.

According to this invention, separate channels 26, 27, 28 and 29 are provided to supply air flow to the root nozzles 31, 32, 33 and 34. Sensing ports 36, 37, 38 and 39 are provided in thrust channels 40 and 41 upstream of the root nozzles 31, 32, 33 and 34 respectively. The pressure levels at the sensing ports 36, 37, 38 and 39 may be used to control the flow in fluidic control devices 43 and 44 as shown in FIGS. 3 and 4 wherein the control ports 45 and 46 are connected to sensing ports 36 and 37 respectively to direct the flow of air from channel 48 between channels 51 and 52 as a function of the difference in the pressure at sensing ports 36 and 37. The flow in channels 51 and 52 is supplied to ducts 26 and 27 and to root nozzles 31 and 32. Sensing ports 38 and 39 control the flow in fluidic control device 44 in the same manner as described above with respect to fluidic control device 43.

In the operation of the device of the invention in normal vertical take-off configuration, shown in FIG. 1, and which will be described with respect to channel 40, the pressure at control ports 36 and 37 will normally be approximately equal and the flow from channel 48 will be divided between channels 51 and 52 to provide approximately equal flow from root nozzles 31 and 32. During transition as the pressure at sensing port 36 drops and the pressure at sensing port 37 rises, the flow from channel 48 will be diverted to cause an increase flow from root nozzle 31 and a decreased flow from nozzle 32. Thus, the flow during transition will be automatically divided between nozzles 31 and 32 as a function of the pressure difference at sensing ports 36 and 37. The same operation will take place in channel 41.

For some applications, it may be desirable to control the boundary layer in the diffuser portion of ducts 40 and 41, as shown in FIG. 5. In this case, sensing ports 66, 67, 68 and 69 are provided to control the flow through nozzles 71, 72, 73 and 74 in a similar manner to that described above. The movement of the doors will cause no great problem since the control lines and output lines of the fluidic control devices would normally be flexible conduits.

While fluidic control devices have been described for controlling the flow to the boundary layer nozzles, other apparatus could also be used, such as bellows controlled valves.

There is thus provided apparatus for controlling the flow from root nozzles into the boundary layer in an injector wing aircraft during transition from vertical take-off to forward flight.

I claim:

1. In an aircraft ejector wing having a plurality of spar members with air flow thrust channel being formed between pairs of spar members; means for providing closable inlets to said flow thrust channels; means for providing closable outlet diffuser doors for said thrust channels; means for providing a primary air flow through said thrust channels to thereby entrain a secondary flow through the thrust channels; said means for providing a primary air flow including a plurality of nozzles adapted to provide a flow of air into the boundary layer adjacent the opposite sides of said thrust channels; a plurality of pressure sensing ports in said thrust channels upstream of said nozzles; means responsive to the pressure at said sensing ports for controlling the flow from said nozzles into the boundary layer in said thrust channels.

2. The device as recited in claim 1 wherein said means for providing a primary air flow through said thrust channels includes a plurality of hypermixing nozzles and a plurality of root nozzles, located between the hypermixing nozzles; said root nozzles being the nozzles adapted to provide a flow of air into the boundary layer adjacent the opposite side of said thrust channels; means for supplying an air flow through said spar members to said hypermixing nozzles; tubular air supply means within said spar members for supplying air to said root nozzles; said means for controlling the flow from said nozzles including means for directing a flow of air into the tubular air supply means for the root nozzles on opposite sides of each thrust channel as a function of the pressure difference at the sensing ports upstream of the root nozzles on opposite sides of each thrust channel.

3. The device as recited in claim 2 wherein said means for directing a flow of air into the tubular air supply means includes a fluidic control device for each thrust channel; means for supplying an air flow to the fluidic control devices; each of said fluidic control devices having first output channels connected to the tubular air supply means on one side of said thrust channels and second output channel connected to the tubular air supply means on the opposite sides of said thrust channels; each of said fluidic control devices having a flow splitter between said first output channel and the second output channel; each of said fluidic control devices having a pair of control ports connected to the sensing ports on opposite sides of said thrust channels, for controlling the flow between the first output channels and the second output channels of the fluidic control devices as a function of the pressure difference at the sensing ports on the opposite sides of each thrust channel.

* * * * *